United States Patent [19]

Kanoshima

[11] Patent Number: 5,285,319
[45] Date of Patent: Feb. 8, 1994

[54] SCANNER LENS FOR READING

[75] Inventor: Yuichiro Kanoshima, Yokohama, Japan

[73] Assignee: Ricoh Company, Ltd., Tokyo, Japan

[21] Appl. No.: 866,355

[22] Filed: Apr. 10, 1992

[30] Foreign Application Priority Data

Apr. 11, 1991 [JP] Japan .................................. 3-79068

[51] Int. Cl.$^5$ .......................... G02B 9/08; G02B 9/62
[52] U.S. Cl. .................................... 359/740; 359/760; 359/775
[58] Field of Search ................ 359/756, 760, 775, 740

[56] References Cited

U.S. PATENT DOCUMENTS

| 3,922,071 | 11/1975 | Kitagawa et al. | 359/756 |
| 4,364,644 | 12/1982 | Ikemori | 359/756 |

FOREIGN PATENT DOCUMENTS

| 49-117030 | 11/1974 | Japan . | |
| 56-155912 | 12/1981 | Japan | 359/775 |
| 63-75720 | 4/1988 | Japan . | |
| 63-75721 | 4/1988 | Japan . | |
| 148438 | 1/1955 | Sweden | 359/775 |

*Primary Examiner*—Bruce Y. Arnold
*Assistant Examiner*—James Phan
*Attorney, Agent, or Firm*—Fish & Richardson

[57] ABSTRACT

A scanner lens for reading has first to fourth lens groups sequentially arranged from an object side to an image side. The first to fourth lens groups are constructed by six lenses. Each of the six lenses is constructed by a positive or negative meniscus lens having a convex or concave face directed on the object side. The scanner lens further has a diaphragm arranged between the second and third lens groups. Refractive indices $N_g$, $N_F$, $N_d$ and $N_C$ at respective wavelengths on lines g, F, d and C, an Abbe's number $\nu$ on line d, and a partial dispersion ratio $\theta = (N_g - N_d)/(N_F - N_C)$ satisfy the following condition, $$(-0.0020793 \cdot \nu + 1.3649) - \theta > 0.004. \qquad (1)$$

with respect to one or both of third and fourth lenses adjacent to the diaphragm. A combined focal length f of an entire lens system and a focal length $f_1$ of the first lens group satisfy the following condition, $$0.95 < f_1/f < 1.15 \qquad (2)$$

1 Claim, 6 Drawing Sheets

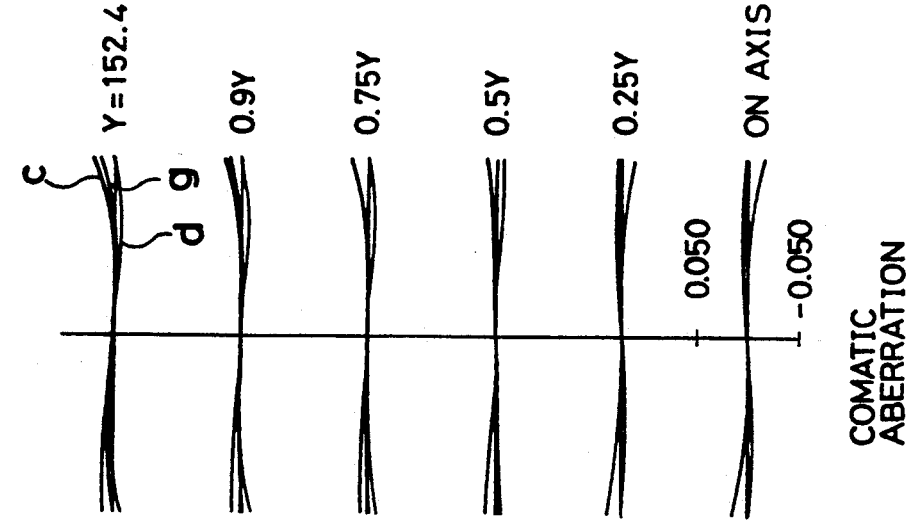
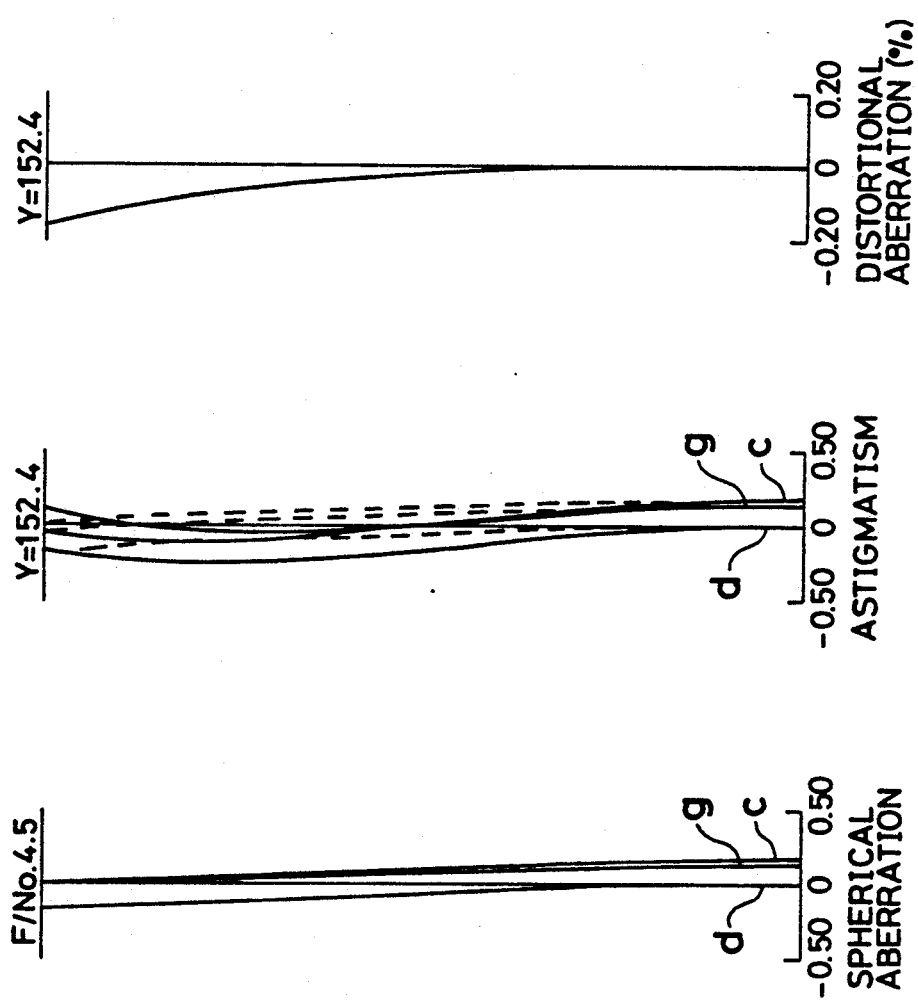

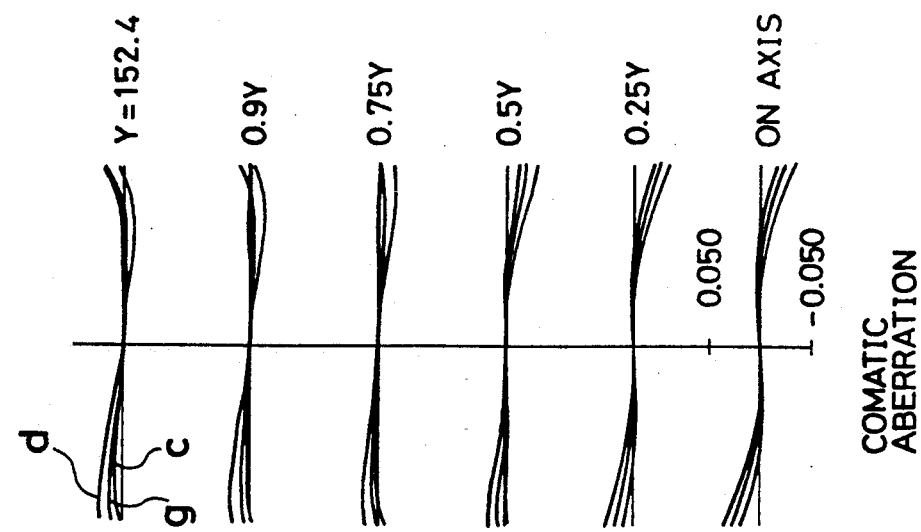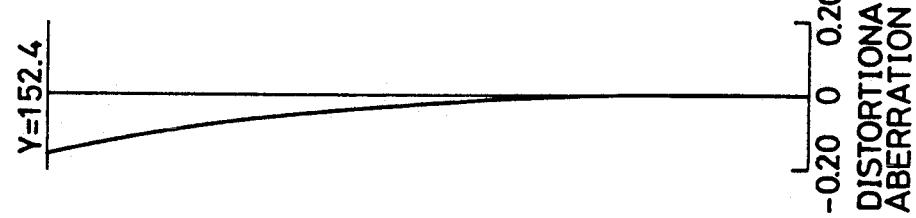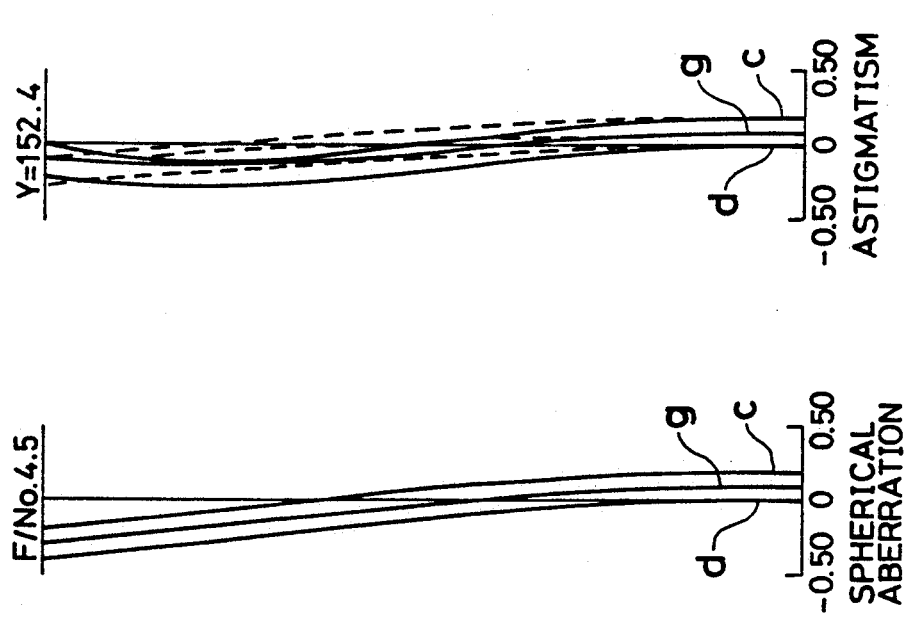

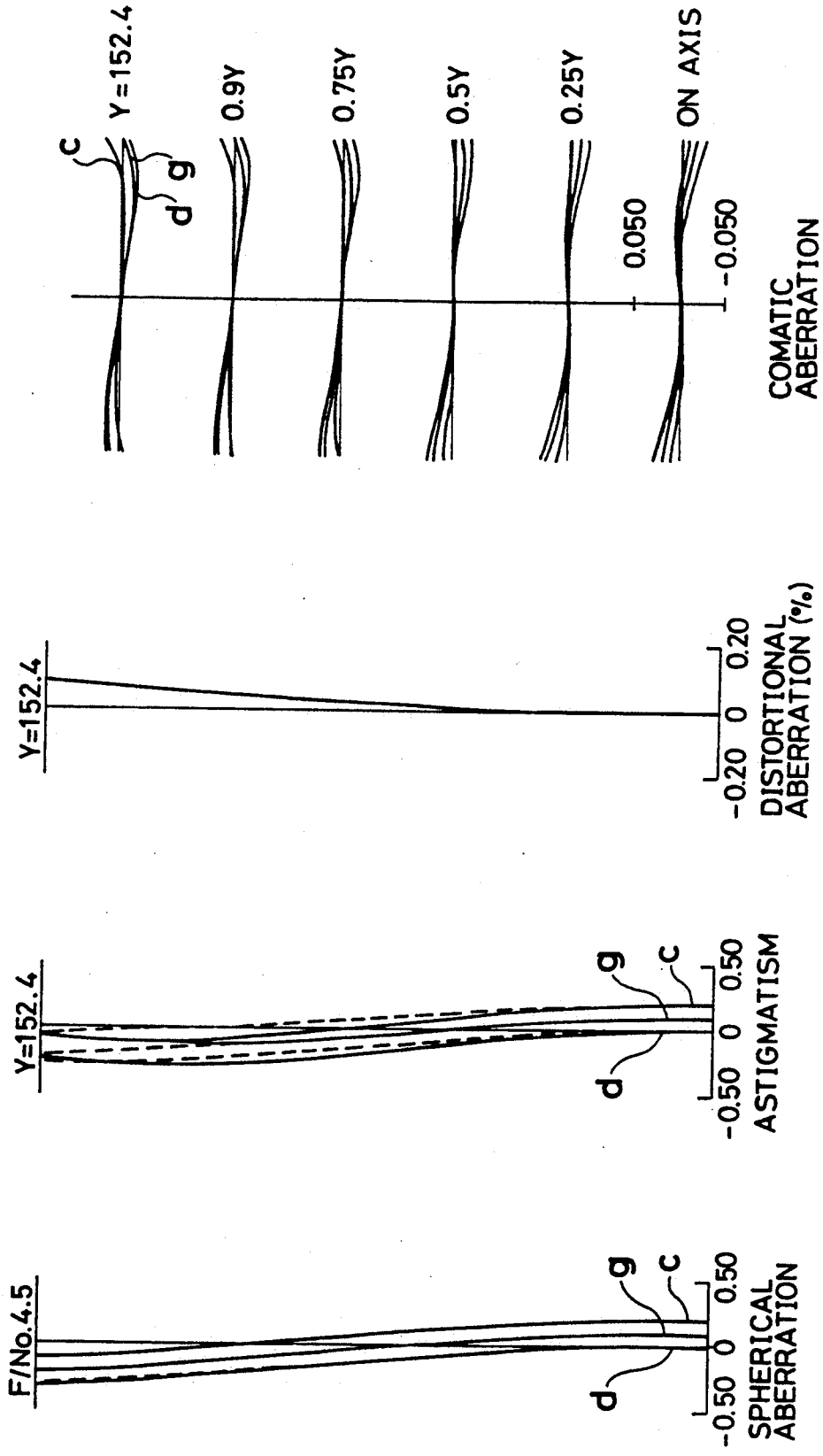

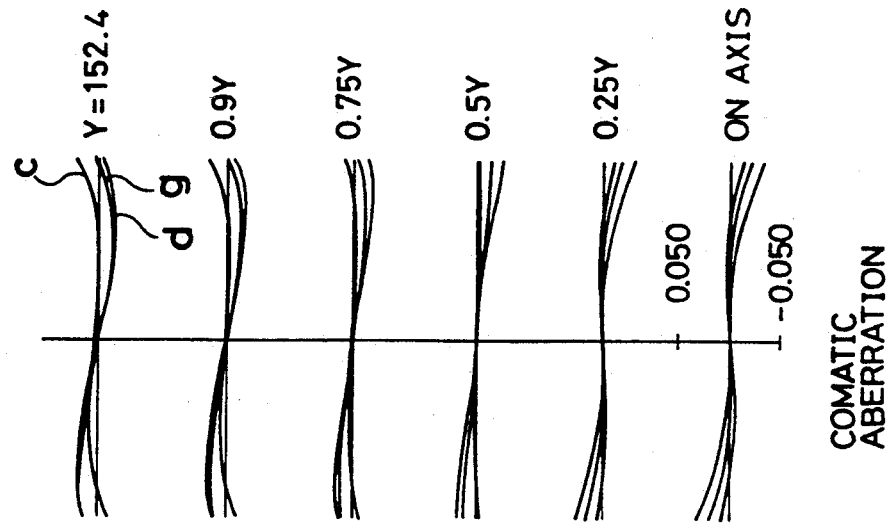
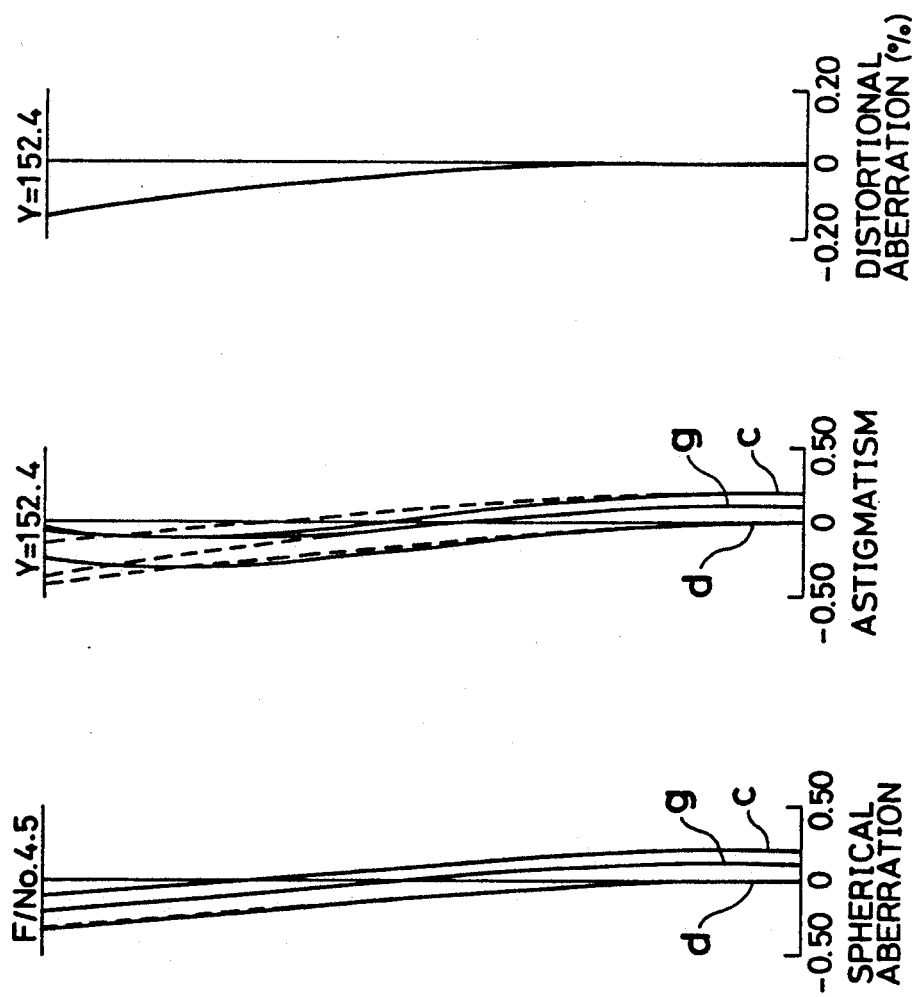

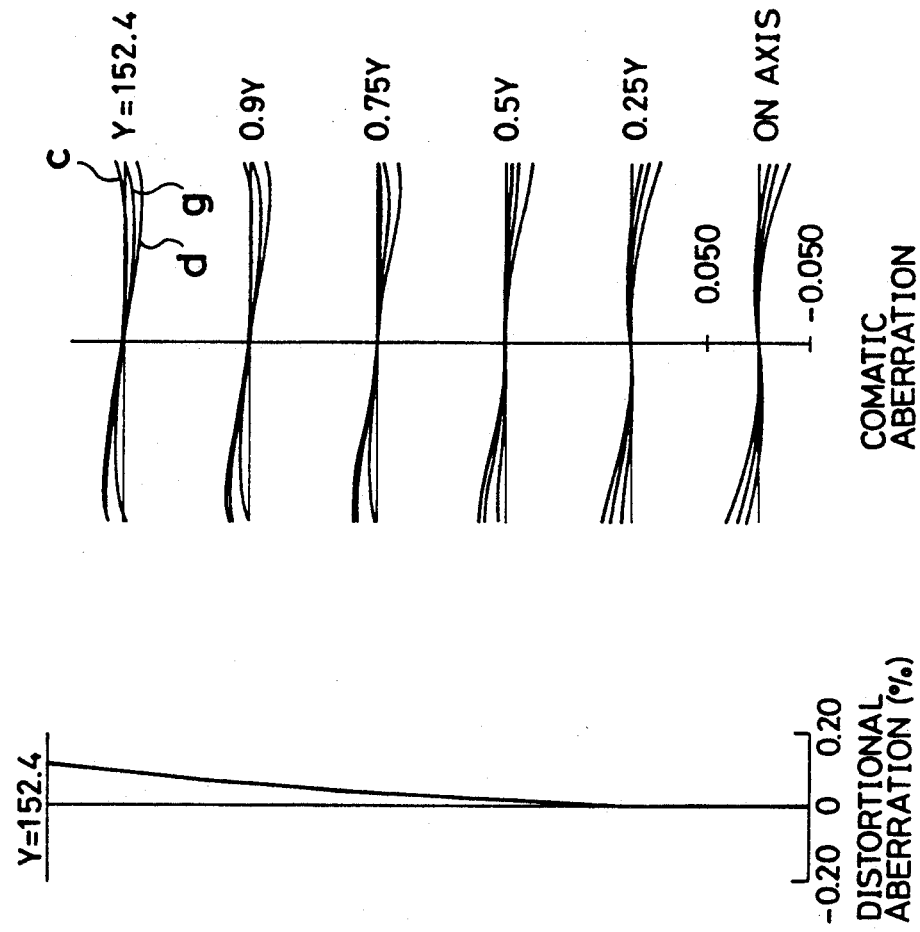

SCANNER LENS FOR READING

BACKGROUND OF THE INVENTION

1. Field of the Invention

The present invention relates to a scanner lens for reading which can be used in a scanner for a facsimile, a digital copying machine, a computer or a word processor.

2. Description of the Related Art

Recently, a novel image sensor such as a three-line one-chip charge coupled device (CCD) has been developed to read a color image. In this image sensor, for example, a light receiving element having red, green and blue filters is arranged on three lines on one chip. A color original image is focused and formed on a light receiving face of the light receiving element. Thus, the original image can be changed to an electric signal by decomposing the original image into three primary colors. It is desirable to preferably apply the scanner lens for reading to such an image sensor.

To preferably read a color original by the above image sensor, it is necessary to preferably perform achromatic processing of the scanner lens with respect to each of red, green and blue such that forming positions of the red, green and blue color images are in conformity with each other on the light receiving face of the image sensor. With respect to the image sensor, it is necessary to correct achromatism of the scanner lens with very high accuracy to generally focus and form a reduced image of the original in size.

There is generally no known scanner lens for reading processed with respect to achromatism such that the scanner lens can be preferably applied to an image sensor such as the above three-line one-chip charge coupled device (CCD).

Further, it is necessary to read a large-sized original at a high speed in a recent image sensor. To satisfy such a requirement, it is desirable to set the scanner lens for reading to have a wide field angle and a large aperture.

SUMMARY OF THE INVENTION

It is therefore an object of the present invention to provide a novel scanner lens for preferably reading a color original by using an image sensor such as the above three-line one-chip charge coupled device.

Another object of the present invention is to provide a novel scanner lens for preferably reading a large-sized original such as size A3 (size 3 of series A) having a width of 304.8 mm and a color original.

In accordance with a first structure of the present invention, the above objects can be achieved by a scanner lens for reading comprising first to fourth lens groups sequentially arranged from an object side to an image side; the first lens group being constructed by a first lens composed of a positive meniscus lens having a convex face directed on the object side; the second lens group being constructed by second and third lenses and having a negative focal length; the second lens being composed of a positive meniscus lens having a convex face directed on the object side; the third lens being composed of a negative meniscus lens having a convex face directed on the object side and joined onto an image side of the second lens; the third lens group being constructed by fourth and fifth lenses and having a negative focal length; the fourth lens being composed of a negative meniscus lens having a concave face directed on the object side; the fifth lens being composed of a positive meniscus lens having a concave face directed on the object side and joined onto an image side of the fourth lens; the fourth lens group being constructed by a sixth lens composed of a positive meniscus lens having a concave face directed on the object side; and the scanner lens further comprising a diaphragm arranged between the second and third lens groups. Refractive indices $N_g$, $N_F$, $N_d$ and $N_C$ at respective wavelengths on lines g, F, d and C, an Abbe's number $\nu$ on line d, and a partial dispersion ratio $\theta = (N_g - N_d)/(N_F - N_C)$ satisfy the following condition, $$(-0.0020793 \cdot \nu + 1.3649) - \theta > 0.004. \tag{1}$$

with respect to one or both of the third and fourth lenses adjacent to the diaphragm.

In accordance with a second structure of the present invention, a combined focal length f of an entire lens system and a focal length $f_1$ of the first lens group satisfy the following condition.

$$0.95 < f_1/f < 1.15 \tag{2}$$

In the scanner lens having the above first and second structures of the present invention, a color original can be preferably read by using an image sensor such as the above three-line one-chip charge coupled device.

Further, it is possible to preferably read a large-sized original such as size A3 (size 3 of series A) having a width of 304.8 mm in addition to a color original.

Further objects and advantages of the present invention will be apparent from the following description of the preferred embodiments of the present invention as illustrated in the accompanying drawings.

BRIEF DESCRIPTION OF THE DRAWINGS

FIGS. 2a to 2d are respectively diagrams of curves of spherical aberration, astigmatism, distortional aberration and comatic aberration in Embodiment 1;

FIGS. 3a to 3d are respectively diagrams of curves of spherical aberration, astigmatism, distortional aberration and comatic aberration in Embodiment 2;

FIGS. 4a to 4d are respectively diagrams of curves of spherical aberration, astigmatism, distortional aberration and comatic aberration in Embodiment 3;

FIGS. 5a to 5d are respectively diagrams of curves of spherical aberration, astigmatism, distortional aberration and comatic aberration in Embodiment 4; and FIGS. 6a to 6d are respectively diagrams of curves of spherical aberration, astigmatism, distortional aberration and comatic aberration in Embodiment 5.

DESCRIPTION OF THE PREFERRED EMBODIMENTS

Figure 1:
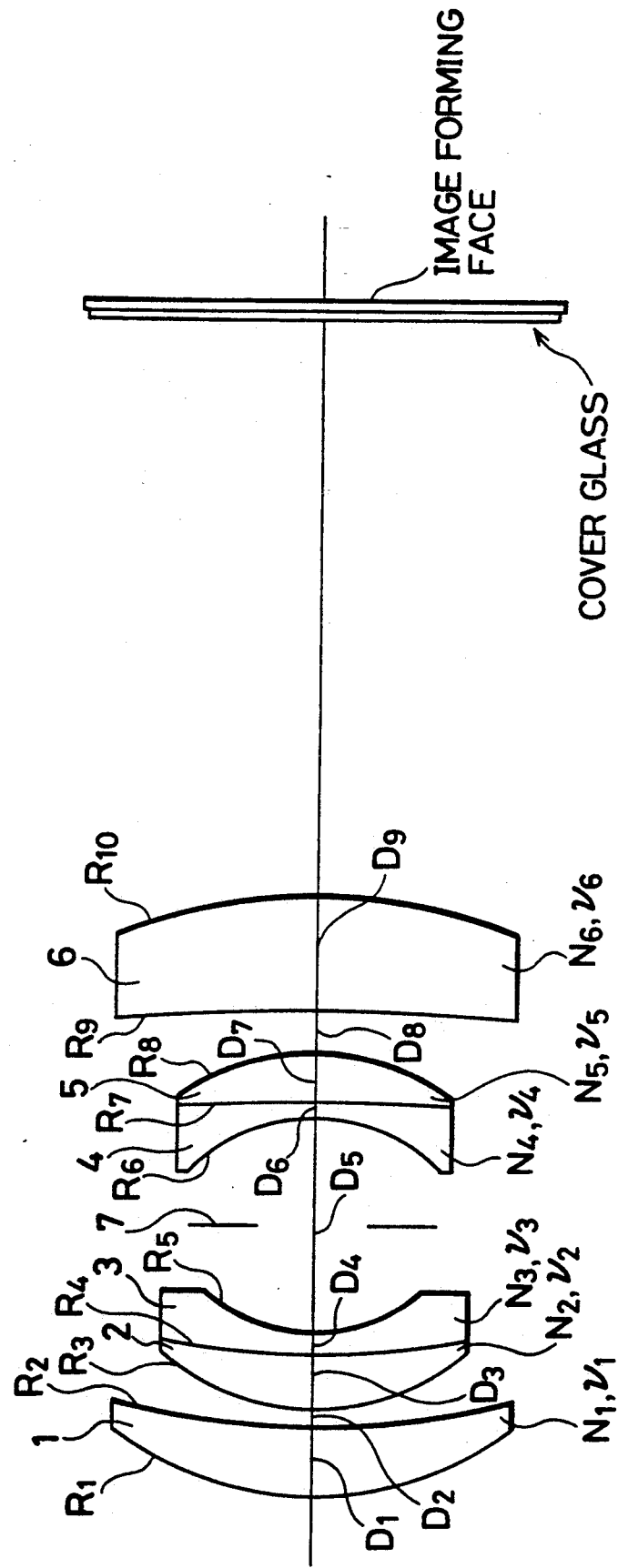
FIG. 1 is a view showing the construction of a scanner lens for reading in the present invention.

The preferred embodiments of a scanner lens for reading in the present invention will next be described in detail with reference to the accompanying drawings.

As shown in FIG. 1, a scanner lens for reading in the present invention has first to fourth lens groups sequentially arranged from an object side to an image side. The scanner lens also has a diaphragm 7 arranged between the second and third lens groups.

A first lens 1 constitutes the first lens group. The first lens 1 is constructed by a positive meniscus lens having a convex face directed on the object side.

The second lens group is constructed by a joining lens composed of a second lens 2 and a third lens 3 and has a negative focal length. The second lens 2 is constructed by a positive meniscus lens having a convex face directed on the object side. The third lens 3 is joined onto an image side of the second lens 2 and is constructed by a negative meniscus lens having a convex face directed on the object side.

The third lens group is constructed by a joining lens composed of a fourth lens 4 and a fifth lens 5 and has a negative focal length. The fourth lens 4 is constructed by a negative meniscus lens having a concave face directed on the object side. The fifth lens 5 is joined onto an image side of the fourth lens 4 and is constructed by a positive meniscus lens having a concave face directed on the object side.

A sixth lens 6 constitutes the fourth lens group and is constructed by a positive meniscus lens having a concave face directed on the object side. Accordingly, the entire scanner lens for reading is constructed by four lens groups composed of six lenses.

In the following description, reference numerals $N_g$, $N_F$, $N_d$ and $N_C$ respectively designate refractive indices at wavelengths on lines g, F, d and C. Reference numeral $\nu$ designates an Abbe's number on line d. A partial dispersion ratio $\theta$ is set as follows.

$$\theta = (N_g - N_d)/(N_F - N_C)$$

In the scanner lens for reading having a first structure of the present invention, one or both of the third lens 3 and the fourth lens 4 adjacent to the diaphragm 7 satisfy the following condition (1).

$$(-0.0020793 \cdot \nu + 1.3649) - \theta > 0.004 \quad (1)$$

In the scanner lens for reading having a second structure of the present invention, the following condition (2) is satisfied in addition to the above condition (1).

$$0.95 < f_1/f < 1.15 \quad (2)$$

In this condition (2), reference numeral f designates a combined focal length of an entire lens system. Reference numeral $f_1$ designates a focal length of the first lens group.

It is necessary to restrain an amount of axial chromatic aberration so as to preferably conform forming positions of red, green and blue images to each other. The condition (1) is a condition for restraining this amount of axial chromatic aberration.

A value within a parenthesis on the left-hand side in the condition (1) shows a formula for calculating a partial dispersion of a lens material. This formula provides a relation about a reference material K7, the partial dispersion ratio $\theta$ of F2 and the Abbe's number $\nu$.

When no first condition (1) is satisfied and the lens material is close to the reference material, no anomalous dispersion of the lens material can be sufficiently provided. Therefore, it is impossible to preferably correct chromatic aberration of the scanner lens in a wide wavelength region from line C to line g.

The condition (2) is a condition for restraining refracting power of the first lens group to increase a field angle and an aperture of the scanner lens for an original. When the ratio $f_1/f$ in the condition (2) exceeds an upper limit thereof, a Petzval's sum is increased so that an image face is greatly inclined in the negative direction of a focal length of the scanner lens. Accordingly, an astigmatic difference is increased and no balances of aberration on an optical axis of the scanner lens and outside this optical axis can be held so that it is difficult to increase the field angle of the scanner lens.

In contrast to this, when the ratio $f_1/f$ in the condition (2) exceeds a lower limit thereof, the Petzval's sum is decreased so that a comatic flare is increased and it is difficult to increase the aperture of the scanner lens. As mentioned above, it is difficult to increase the field angle and the aperture of the scanner lens when the refracting power of the first lens group is excessively increased and decreased. When the refracting power of the first lens group is set in a range for satisfying the condition (2), it is possible to realize a large field angle, a large aperture and a preferable image forming performance.

Concrete Embodiments 1 to 5 of the present invention will next be described.

As shown in FIG. 1, reference numeral $R_i$ designates a radius of curvature of an i-th lens face counted from the object side. Reference numeral $D_i$ designates a distance between the i-th lens face and a (i+1)-th lens face on the optical axis of the scanner lens. Reference numerals $N_j$ and $\nu_j$ respectively designate a refractive index and an Abbe's number of the material of a j-th lens counted from the object side with respect to line d. Reference numerals F/No, f and $f_1$ respectively designate brightness, a combined focal length of the entire lens system and a focal length of the first lens group. Reference numbers $\omega$ and m respectively designate a half field angle and a magnification of the scanner lens. Reference numerals $\theta_3$ and $\theta_4$ respectively designate partial dispersion ratios of the third and fourth lenses. The combined focal length f and the focal length $f_1$ are calculated on line d.

Embodiment 1

F/No = 4.5, f = 100, $f_1$ = 98, $f_1/f$ = 0.98,
$\omega$ = 19.4°, m = 0.2205, $\theta_3$ = 1.2728, $\theta_4$ = 1.3076
$\{(-0.0020793 \cdot \nu_3 + 1.3649) - \theta_3\} = 0.0096$
$\{(-0.0020793 \cdot \nu_4 + 1.3649) - \theta_4\} = -0.0040$

| i | $R_i$ | $D_i$ | j | $N_j$ | $\nu_j$ |
|---|-------|-------|---|-------|---------|
| 1 | 44.173 | 8.64 | 1 | 1.75500 | 52.3 |
| 2 | 100.819 | 2.23 | | | |
| 3 | 30.496 | 7.20 | 2 | 1.67000 | 57.3 |
| 4 | 134.015 | 1.92 | 3 | 1.65412 | 39.7 |
| 5 | 21.138 | 26.82 | | | |
| 6 | −24.125 | 1.94 | 4 | 1.71736 | 29.5 |
| 7 | −332.004 | 5.99 | 5 | 1.78650 | 50.0 |
| 8 | −32.291 | 5.74 | | | |
| 9 | −255.010 | 14.05 | 6 | 1.87400 | 35.3 |
| 10 | −67.908 | | | | |

Embodiment 2

F/No = 4.5, f = 100, $f_1$ = 113, $f_1/f$ = 1.13,
$\omega$ = 19.4°, m = 0.2205, $\theta_3$ = 1.2728, $\theta_4$ = 1.2728
$\{(-0.0020793 \cdot \nu_3 + 1.3649) - \theta_3\} = 0.0096$
$\{(-0.0020793 \cdot \nu_4 + 1.3649) - \theta_4\} = 0.0096$

| i | $R_i$ | $D_i$ | j | $N_j$ | $\nu_j$ |
|---|-------|-------|---|-------|---------|
| 1 | 40.213 | 6.27 | 1 | 1.56873 | 63.2 |
| 2 | 101.300 | 0.26 | | | |
| 3 | 29.035 | 7.46 | 2 | 1.72600 | 53.6 |
| 4 | 141.335 | 1.91 | 3 | 1.65412 | 39.7 |
| 5 | 20.107 | 25.52 | | | |
| 6 | −22.125 | 1.91 | 4 | 1.65412 | 39.7 |
| 7 | −496.525 | 6.82 | 5 | 1.72600 | 53.6 |
| 8 | −29.281 | 0.52 | | | |
| 9 | −339.482 | 15.32 | 6 | 1.65160 | 58.5 |
| 10 | −67.890 | | | | |

Embodiment 3

F/No = 4.5, f = 100, $f_1$ = 105, $f_1/f$ = 1.05,
$\omega$ = 19.4°, m = 0.2205, $\theta_3$ = 1.2709, $\theta_4$ = 1.2880
$\{(-0.0020793 \cdot \nu_3 + 1.3649) - \theta_3\} = 0.0092$
$\{(-0.0020793 \cdot \nu_4 + 1.3649) - \theta_4\} = 0.0047$ -continued

| i | $R_i$ | $D_i$ | j | $N_j$ | $\nu_j$ |
|---|---|---|---|---|---|
| 1 | 40.238 | 6.25 | 1 | 1.67000 | 57.4 |
| 2 | 88.201 | 1.17 | | | |
| 3 | 32.128 | 6.96 | 2 | 1.71300 | 53.9 |
| 4 | 139.594 | 1.94 | 3 | 1.64450 | 40.8 |
| 5 | 21.442 | 26.97 | | | |
| 6 | −22.407 | 1.94 | 4 | 1.72047 | 34.7 |
| 7 | −107.500 | 5.99 | 5 | 1.75500 | 52.3 |
| 8 | −29.995 | 4.86 | | | |
| 9 | −153.324 | 5.43 | 6 | 1.77250 | 49.6 |
| 10 | −51.249 | | | | |

Embodiment 4

F/No = 4.5, f = 100, $f_1$ = 100, $f_1/f$ = 1.00,
$\omega$ = 19.4°, m = 0.2205, $\theta_3$ = 1.2806, $\theta_4$ = 1.2880
$\{(-0.0020793 \cdot \nu_3 + 1.3649) - \theta_3\}$ = 0.0063
$\{(-0.0020793 \cdot \nu_4 + 1.3649) - \theta_4\}$ = 0.0047

| i | $R_i$ | $D_i$ | j | $N_j$ | $\nu_j$ |
|---|---|---|---|---|---|
| 1 | 42.209 | 6.38 | 1 | 1.71300 | 53.8 |
| 2 | 97.428 | 3.66 | | | |
| 3 | 34.641 | 6.03 | 2 | 1.72600 | 53.6 |
| 4 | 130.330 | 2.55 | 3 | 1.67650 | 37.5 |
| 5 | 22.980 | 25.65 | | | |
| 6 | −22.087 | 2.55 | 4 | 1.72047 | 34.7 |
| 7 | −119.305 | 6.38 | 5 | 1.75500 | 52.3 |
| 8 | −30.280 | 3.83 | | | |
| 9 | −195.866 | 6.64 | 6 | 1.77250 | 49.6 |
| 10 | −53.767 | | | | |

Embodiment 5

F/No = 4.5, f = 100, $f_1$ = 104, $f_1/f$ = 1.04,
$\omega$ = 19.4°, m = 0.2205, $\theta_3$ = 1.2806, $\theta_4$ = 1.2880
$\{(-0.0020793 \cdot \nu_3 + 1.3649) - \theta_3\}$ = 0.0063
$\{(-0.0020793 \cdot \nu_4 + 1.3649) - \theta_4\}$ = 0.0047

| i | $R_i$ | $D_i$ | j | $N_j$ | $\nu_j$ |
|---|---|---|---|---|---|
| 1 | 43.273 | 6.40 | 1 | 1.71300 | 53.8 |
| 2 | 97.301 | 3.18 | | | |
| 3 | 34.585 | 6.80 | 2 | 1.72600 | 53.6 |
| 4 | 187.157 | 1.94 | 3 | 1.67650 | 37.5 |
| 5 | 23.275 | 26.97 | | | |
| 6 | −21.121 | 1.95 | 4 | 1.72047 | 34.7 |
| 7 | −93.612 | 6.37 | 5 | 1.75500 | 52.3 |
| 8 | −28.510 | 2.26 | | | |
| 9 | −142.613 | 5.52 | 6 | 1.77250 | 49.6 |
| 10 | −49.416 | | | | |

FIGS. 2 to 6 are diagrams respectively showing curves of spherical aberration, astigmatism, distortional aberration and comatic aberration with respect to these Embodiments 1 to 5. In these aberration diagrams, reference numerals d, g and C respectively relate to lines d, g and C. Reference numeral Y designates the height of an object. In FIGS. 2a to 6a showing spherical aberration, a sine condition is shown by a broken line. In FIGS. 2b to 6b showing astigmatism, radial and meridional directions are respectively shown by solid and broken lines. In the respective Embodiments 1 to 5, the aberrations are preferably corrected.

As mentioned above, in accordance with the above novel scanner lens for reading in the present invention, it is possible to preferably read an original including a color original. In the scanner lens having a second structure of the present invention, it is possible to preferably read a large-sized original such as size A3 (size 3 of series A) including a color original.

Many widely different embodiments of the present invention may be constructed without departing from the spirit and scope of the present invention. It should be understood that the present invention is not limited to the specific embodiments described in the specification, except as defined in the appended claims.

What is claimed is:

1. A scanner lens for reading, comprising first to fourth lens groups sequentially arranged from an object side to an image side;

said first lens group being constructed by a first lens composed of a positive meniscus lens having a convex face directed on the object side;

said second lens group being constructed by second and third lenses and having a negative focal length, said second lens being composed of a positive meniscus lens having a convex face directed on the object side, said third lens being composed of a negative meniscus lens which has a convex face directed on the object side and is joined onto an image side of said second lens;

said third lens group being constructed by fourth and fifth lenses and having a negative focal length, said fourth lens being composed of a negative meniscus lens having a concave face directed on the object side, said fifth lens being composed of a positive meniscus lens which has a concave face directed on the object side and is joined onto an image side of said fourth lens;

said fourth lens group being constructed by a sixth lens composed of a positive meniscus lens having a concave face directed on the object side;

said scanner lens further comprising a diaphragm arranged between said second and third lens groups;

refractive indices $N_g$, $N_F$, $N_d$, and $N_C$, at respective wavelengths on lines g, F, d, and C, an Abbe's number $\nu$ on line d, and a partial dispersion ratio $\theta = (N_g - N_d)/(N_F - N_C)$ satisfying the following condition:

$$(-0.0020793 \cdot \nu + 1.3649) - \theta > 0.004 \quad (1)$$

with respect to at least one of said third and fourth lenses adjacent to said diaphragm; and a combined focal length f of an entire lens system and a focal length $f_1$ of said first lens group satisfying the following condition:

$$0.95 < f_1/f < 1.15. \quad (2)$$

* * * * *